Dec. 11, 1962 D. B. DOOLITTLE 3,067,697
CONTROLLED HIGH-SPEED HIGHWAY
Filed March 8, 1956 4 Sheets-Sheet 3
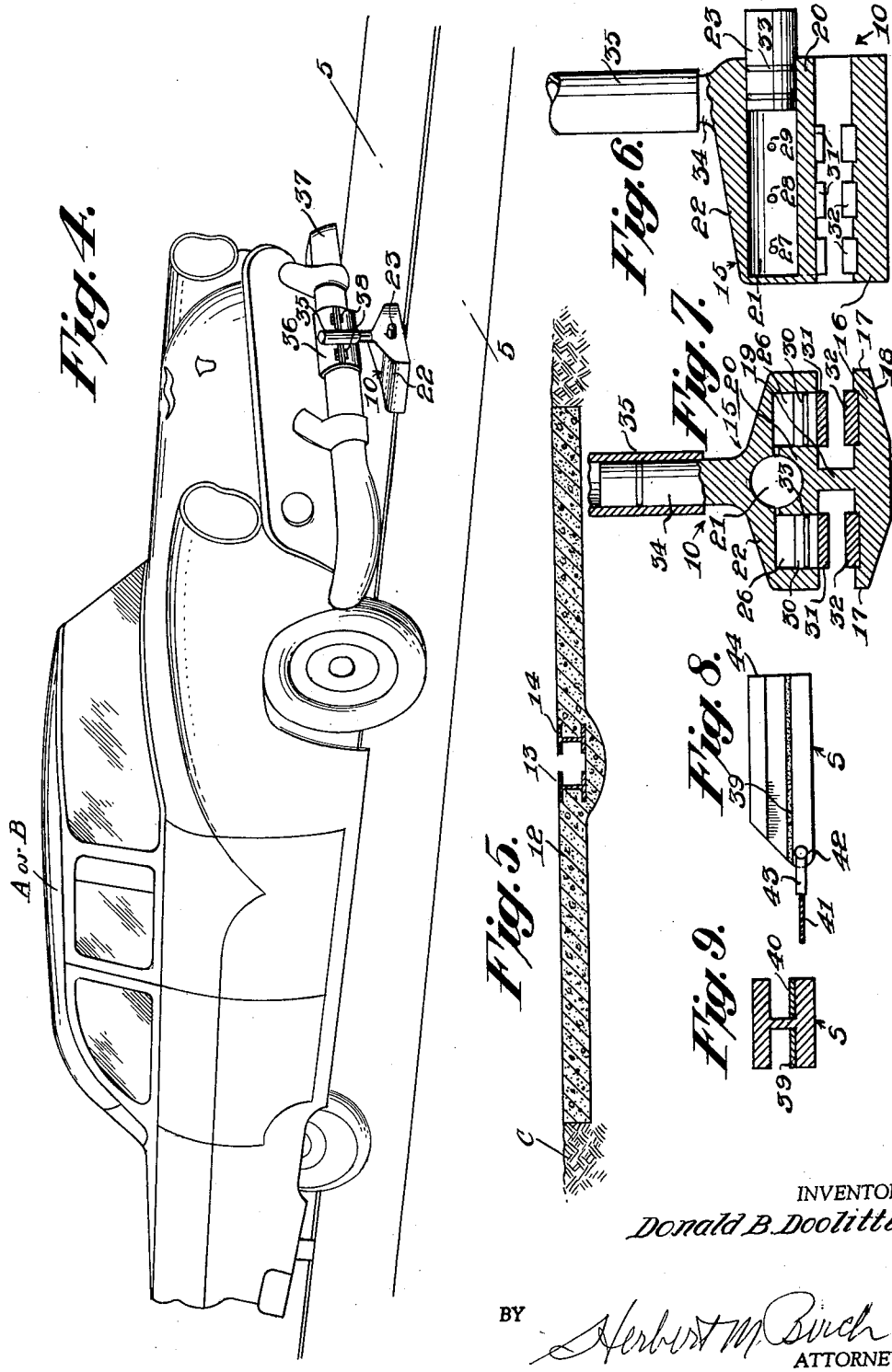
INVENTOR
Donald B. Doolittle.
BY
ATTORNEY

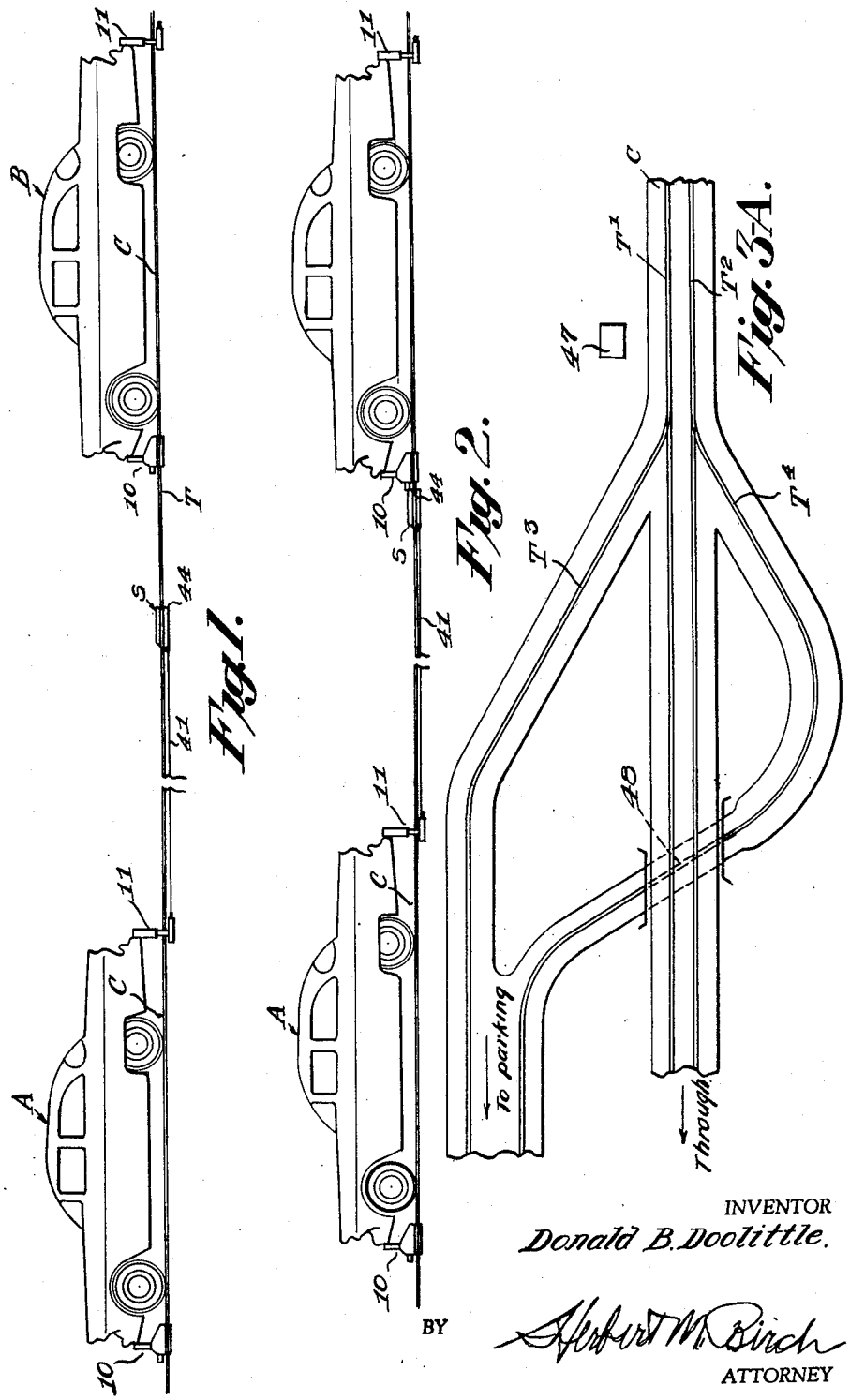

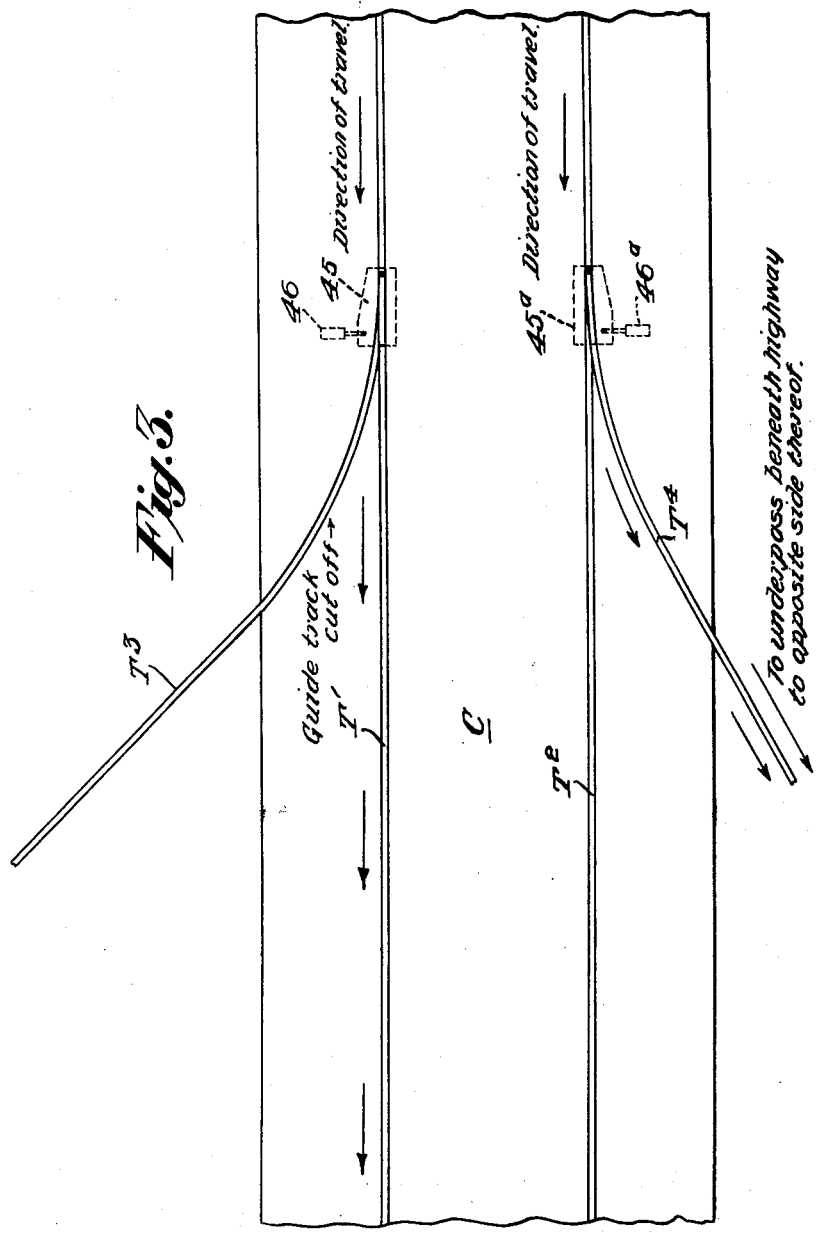

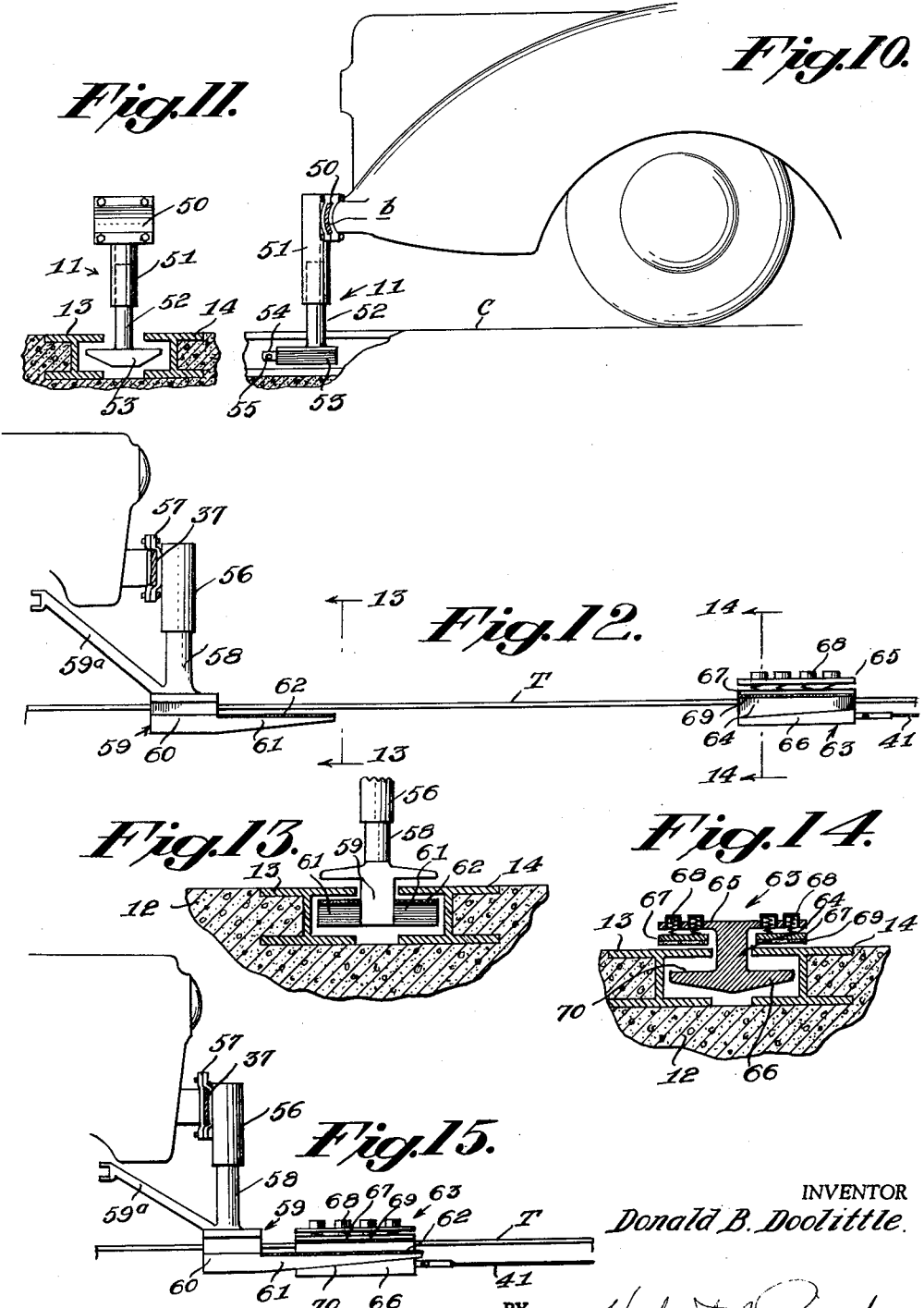

United States Patent Office 3,067,697
Patented Dec. 11, 1962

3,067,697
CONTROLLED HIGH-SPEED HIGHWAY
Donald B. Doolittle, Wilmington, Del., assignor to All American Engineering Company, Wilmington, Del., a corporation of Delaware
Filed Mar. 8, 1956, Ser. No. 570,343
8 Claims. (Cl. 104—246)

This invention relates to safety means for guiding vehicles at high speeds over highways under their own power.

It is an object of this invention to provide novel means for controlling motor vehicle travel over highways with substantially complete elimination of the usual collision and road hazards of the present day highways.

A further and more particular object of the invention is to provide front and rear guides for rigid connection to a motor vehicle and which guides cooperate with a guide track, and brake means operatively associated with said guides, whereby a trailing vehicle when running at a speed greater than an advance vehicle will be automatically decelerated at a predetermined distance rearwardly of said advance vehicle.

Still a further object is to provide a system of track switching, whereby the vehicle and guide means may be expeditiously and efficiently switched from a main track section in the highway to a side parking area.

A further object is to provide means for guiding trains of motor vehicles or trailers at high speeds between points of travel.

The above and other objects and advantages of this invention will appear more fully hereinafter from a consideration of the detailed description which follows, taken with the accompanying drawings wherein two embodiments of apparatus used to practice the same are illustrated. It is to be expressly understood, however, that the drawings are for the purpose of illustration only and are not designed as a definition of the limits of the invention.

In the drawings wherein like reference characters refer to like parts throughout the several views:

FIGURE 1 is a side elevational view of schematic nature illustrating two motor vehicles in the process of travelling over a highway using novel track and guide arrangements of this invention;

FIGURE 2 is a similar view to FIGURE 1 illustrating the rear vehicle in guide brake applying position, to thereby prevent overrunning with respect to the front vehicle;

FIGURE 3 is a top plan view schematically illustrating the track means in the highway, side switching tracks to a parking area and a switch actuating means;

FIGURE 3–A is a schematic plan view of an underpass arrangement to which the lower track in FIGURE 3 may extend;

FIGURE 4 is a general perspective view of a motor vehicle, a roadway, a track and vehicle attached guide means mounted in the track;

FIGURE 5 is a cross section view of the roadway and track structure taken on section line 5—5 of FIGURE 4;

FIGURE 6 is a longitudinal sectional view of the front guide for each vehicle;

FIGURE 7 is a transverse section of the front guide;

FIGURE 8 is a side elevational view of one of the safety shoe means mounted on the track between vehicles and dragged or towed by a cable coupled to the rear vehicle guide;

FIGURE 9 is a transverse sectional view of the safety shoe;

FIGURE 10 is a side elevational view of the rear portion of a vehicle showing the rear guide connected thereto and its operative association with the track;

FIGURE 11 is a transverse sectional view as observed from the front of the rear guide in FIGURE 10 and showing the bracket which supports the guide and is attachable to the vehicle rear bumper;

FIGURE 12 is a side elevational view showing a modified form of front guide attached to the front of a vehicle, fragmentally indicated, in operative association with a track and further showing a modified form of safety shoe being towed by a vehicle in advance of the one indicated;

FIGURE 13 is a transverse sectional view as observed in the plane of line 13—13 on FIGURE 12;

FIGURE 14 is a transverse sectional view as observed in the plane of line 14—14 on FIGURE 12;

FIGURE 15 is a side elevational view generally corresponding to FIGURE 12 but wherein the front guide and safety shoe have come into brake actuating contact.

Referring in detail to the drawings and first with particular reference to FIGURES 1 and 2, there are shown for example, two motor vehicles A and B. These vehicles are conventional types and drive over the highway C under their own power. However, each vehicle is guided along a track T by means, such as the front guide means 10 and the rear guide means 11, so that while travelling over the highway C on the track T it is not necessary to steer the vehicle except to follow the track directions. The highway C comprises a concrete roadbed 12 and track means, such as parallel spaced apart I-beams 13 and 14 embedded therein, see FIGURE 5.

The front guide means 10 as is particularly indicated in FIGURES 6 and 7 comprises a cast sectional housing 15 formed with an inverted T-shaped base 16, whose exterior surface from the side edges 17 is chamfered as at 18, to thereby clear the respective lower base portions of the track sections 13 and 14. The central web 19 of the guide base 16 extends upward into an elongated longitudinal enlargement 20 formed integrally with the upper part 22 of the guide. This enlargement is formed with a bore 21 to form a complete cylinder for a piston 23 extending forward of the guide 10 for engagement with a safety shoe S, see FIGURE 2. On each side of the enlargement 20 are a plurality of fluid brake cylinders 26 with the axes of their respective bores at substantially right angles to the axis of the bore of cylinder 21. The cylinder 21 is formed with spaced openings 27, 28 and 29 in the wall thereof at each side of its axis and each of which extends through to one of each of the respective brake cylinders.

In each brake cylinder is suitably mounted a piston 30 with a projecting brake shoe 31. Each piston and brake shoe unit is mounted in its respective cylinder so as to engage with the top surface of each respectively adjacent track section 13 and 14, while the inner surface of the base 16 has mounted therein a set of brake shoes 32 engageable with the under surface of each respectively adjacent track section 13 and 14. Each respective piston may be provided with the usual piston rings, such as 33. The upper portion 22 of the guide extends upward into a reduced neck 34, which neck telescopically mounts within the bore of a bracket, such as hollow tube 35 suitably secured to a clamp 36, see FIGURE 4. This clamp is formed in two sections and bolts onto the bumper 37 or any other vehicle frame portion found practical as the leading or foremost projecting part of the vehicle, as by bolts 38.

The safety shoe S shown in FIGURES 1, 2, 8 and 9 is an H-shaped elongated formation with track engaged friction shoes 39 and 40. These shoes engage the under surface of each respectively adjacent track rail 13 and 14 as the vehicle A, for example, drives forward. The rear guide 11 carried by the rear bumper of the vehicle A is tethered by a cable 41 to the nose 42 of safety shoe S by coupling 43 and the tail end 44 is free to be engaged by the projecting end of the piston 23 of the front guide 10 of the following vehicle B, see FIGURE 2.

The tracks T in highway C may be uninterrupted for any desired distance. However, provision may be made for switching the vehicles off the main track at desired points by means of guide track cut-offs at which points the vehicles may be driven to parking areas. Thus, as indicated in FIGURE 3, track $T^1$ is shown as being provided with a cut-off track section $T^3$ and a switch 45 is provided at the point of cut-off of track section $T^3$ from the main track $T^1$ and which switch is operable by a solenoid 46. The track $T^2$ is also provided with a cut-off track section $T^4$ and a switch $45^a$ is provided for same which is also operable by a solenoid $46^a$ and the solenoids are preferably controlled from a tower 47 (FIG. 3–A).

In order that a vehicle moving on track $T^2$ may be driven to the parking area to which track section $T^3$ extends without crossing the highway C, an underpass 48 is provided for track section $T^4$ as is indicated in FIGURE 3–A.

The rear guide means 11 is disclosed in detail in FIGURES 10 and 11 and which in a preferred structural embodiment thereof comprises a clamp 50 for rigid connection to the rear bumper b of the vehicle and which is rigid with the upper end of a tubular member 51. Telescopically engaged within the tubular member 51 is the upper end portion of a cylindrical shank 52 of a guide comprising in addition to said shank an elongated shoe or base 53 which is disposed between the I-beams 13 and 14 with the shank 52 guidingly supported therebetween. The said base 53 is provided with a projection 54 having an aperture 55 therein for attachment of the adjacent end of said cable 41.

*Operation*

In the foregoing description the apparatus and the structural features of the several elements thereof have been described in detail. The actual operation of these elements and their respective co-active relations to accomplish the novel results of the invention will now be described. For example, the drivers of vehicles A and B desire to make use of the high speed highway C and drive their vehicles from a side parking area to one of the connecting switch tracks. Each vehicle will preferably be equipped with a front and rear guide and also with one safety shoe and cable for connection to the rear guide. These members are fastened in place and the vehicles are driven to the highway and are continued to be driven forward under their own power at a high predetermined speed with their respective guide means and safety shoes in track engagement. Each front guide 10 is supplied or filled with fluid from a suitable source in the vehicle and if the rear vehicle B should go relatively faster than the preceding vehicle A, the brake plunger or piston 23 of the front guide 10 will contact with the tail end 44 of the safety shoe S being dragged by the cable 41 of the rear guide 11 of vehicle A. Such contact presses in the piston 23 of the front guide of vehicle B which causes fluid displacement through openings 27, 28 and 29 from the cylinder 21 into brake piston cylinders 26 to apply the brake shoes 31 and 32 to the rails of tracks 13 and 14, respectively. This braking action slows down the speed of the vehicle B accordingly.

The safety shoe S is made sufficiently heavy to provide enough mass inertia to actuate the plunger or piston 23 of the guides 10 to varying degrees of braking energy when its weight is even slightly picked up by the overrun of the trailing guide 10. Thus the guide brake actuation is very similar to a driver's foot brake actuation. Also, the conventional vehicle brakes may be used as in normal driving by the operator of the vehicle and the safety shoe is provided, to thereby relieve much of the usual constant vigilance required in high speed highway travel.

Thus, there is provided a novel system and apparatus for high speed highway travel with little danger of collision or road hazards. Also, a novel roadbed and guideway is provided, which is simply and economically installable in any existing highway.

Referring now to FIGURES 12 to 15, inclusive, of the drawings, wherein the second embodiment of the invention is disclosed, the front guide means will be seen to comprise a tubular member 56 which is rigidly secured to the front vehicle bumper 37 by means of a suitable clamp 57.

A guide member cylindrical shank 58 has its upper end portion telescopically engaged within said tubular member 56 and the lower end of said shank is rigid with a combination guide and brake shoe 59 which is preferably provided with a brace $59^a$. The brake shoe 59 includes a body portion 60 which is disposable between the I-beams 13 and 14 for guiding thereby and a pair of laterally spaced parallel tongues 61 project longitudinally from one end of the body portion 60. As is more particularly indicated in FIGURE 15, the upper faces of said tongues are horizontal and are each provided with a brake lining 62. The lower faces of said tongues 61 are upwardly inclined from said body portion 60 to the free ends of the tongues for a purpose presently to appear.

In accordance with this modified embodiment of the invention the shoe S according to the first embodiment is replaced by a brake shoe 63 which as indicated in FIGURE 14 is of generally I form in cross section and which comprises a central vertical web 64 disposible between the adjacent edges of the upper flanges of I-beams 13 and 14, a top plate 65 disposable above the I-beams and a base 66 disposable between the I-beams, all as shown in FIGURE 14. A pair of laterally spaced brake shoes 67 are disposed between said top plate 65 and said I-beams and are yieldably connected to said top plate by means of coil spring 68 whereby the brake shoes are normally in spaced relation to said top plate and the top flanges of the I-beams 13, 14 as is clearly indicated in FIGURE 14. The brake shoes 67 are each provided with a friction lining 69 opposing the upper faces of the I-beams.

The base 66 is provided with a face 70 at each side of web 64 which is inclined in conformity with the inclination of said tongues 61 as indicated in FIGURE 15 for a purpose later to appear.

As is indicated in FIG. 12 the shoe 63 is towed by an advance vehicle by the cable 41 whose rear end is attached to the shoe and whose forward end is attached to the projection 54 on the rear guide 11. Also shown in this figure is a trailing vehicle whose front guide is moving in the direction of the shoe. Upon uniform speed of the advance and trailing vehicle the said shoe and front guide will remain in fixed spaced relation. However, upon greater speed of the trailing vehicle than that of the advance vehicle the front guide will engage the shoe as is indicated in FIGURE 15. Upon engagement of the front guide with the shoe, the lower inclined faces of the tongues 61 of the front guide will engage the inclined faces 70 on the shoe with a resulting upward movement of the tongues until the brake linings 62 thereon engage the lower faces of the inwardly directed flanges on the I-beams 13 and 14. This action will cause downward movement of the shoe 63 with the brake lining 67 thereon engaged with the upper faces of said I-beam flanges. Thus a dual braking action will be applied to the trailing vehicle. However, such braking action will be gradual and will not cause a sudden stopping of the vehicle.

At the same time the advance vehicle is free to accelerate and move away from the trailing vehicle inasmuch as the braking action will be immediately released upon movement of the shoe away from the guide tongues. It is of course to be understood that the brake shoe will have sufficient inertia to establish the initial braking action.

Without further description it is thought that the many advantages of the present invention will be apparent and while only two embodiments thereof are illustrated, it is to be expressly understood the invention is not limited thereto, as various changes may be made in the parts and combinations thereof as will now appear to those skilled in the art. For a definition of the limits of the invention, reference should be had to the appended claims.

What is claimed is:

1. Overrunning preventing means for high speed safety control of conventional rubber tired motor vehicles comprising, in combination, a wheel engaging roadbed and a track means in the roadbed below the surface thereof, guide means slidably mounted on said track means, coupling means carried by said guide means removably connected to the frame structure of a motor vehicle having the wheels thereof straddling said track means an engaging the roadbed, and obstacle slidably mounted on said track means, a cable connecting said obstacle to the rear of a first motor vehicle carrying said guide means, and brake means controlled by engagement of the guide means of a second vehicle with the obstacle trailed by the first vehicle upon overrunning of the second vehicle with respect to the first vehicle to provide a variable braking force on said second vehicle in proportion to the differential in speed between said vehicles such that when said vehicles are traveling at the same speed, no braking action will be effected.

2. Overrunning preventing means for high speed safety control of conventional rubber tired motor vehicles comprising in combination, a wheel engaging roadbed and a track means in the roadbed below the surface thereof, guide means slidably mounted on said track means, coupling means carried by said guide means removably connected to the frame structure of a motor vehicle having the wheels thereof straddling said track means and engaging the roadbed, and brake means for said guide means, said brake means being operated by an obstacle engaging plunger movably supported by the guide means, said plunger extending in advance of the guide means and the vehicle frame structure whereby upon engagement of said plunger with said obstacle, said brake means will exert a variable braking force on said vehicle through said track means in proportion to the differential in speed between said plunger and said obstacle.

3. The overrunning preventing means for high speed safety control of motor vehicles described in claim 2, wherein the roadbed comprises an elongated central concrete base and a pair of parallel spaced apart flanged guide rails partly embedded therein, said rail flanges engaging with said vehicle carried guide means.

4. The overrunning preventing means for high speed safety control of motor vehicles described in claim 2, wherein said guide means include a front and a rear guide, said front guide comprising a housing containing fluid and brake elements, said elements being engageable with said track means and said rear guide dragging a safety shoe adapted to apply the brake elements of the front guide of a second vehicle following the first vehicle over the highway on the track.

5. Overrunning preventing means for high speed safety control of conventional rubber tired vehicles comprising, in combination, a wheel engaging roadbed having a track means therein and below the surface thereof, guide means slidably mounted on said track means, coupling means carried by said guide means removably connected to the front end of a motor vehicle having the wheels thereof straddling said track means, brake means for said guide means, said brake means comprising track engageable friction surfces on said guide means, second guide means removably connected to the rear end of said vehicle extending into said track means below the surface of said roadbed, and sliding means attached to and trailing behind said second guide means in said track means which upon contact of the front guide means of an approaching vehicle will move said friction surfaces into braking engagement with said track means with a variable force substantially proportional to the differential in speed between said first and second vehicles such that when said vehicles are travelling at the same speed, no braking action is effected.

6. Overrunning preventing means for high speed safety control of conventional rubber tired motor vehicles comprising, in combination, a wheel engaging roadbed having a track means therein and below the surface thereof, guide means mounted on said track means, means for removably connecting said guide means to the front end of a vehicle having the wheels thereof straddling said track means, a shoe slidably mounted on said track means, a cable connecting said shoe to the rear end of an advance vehicle, track engageable brake means on said guide means and said shoe and cooperating means on said guide means and said shoe for bringing said brake means into braking engagement with said track means upon engagement of the guide means of a trailing vehicle with the shoe towed by an advance vehicle.

7. Overrunning preventing means for high speed safety control of conventional rubber tired motor vehicles comprising, in combination, a wheel engaging roadbed having a track means therein and below the surface thereof, a guide means mounted on said track means, means for removably connecting said guide means to the front end of a vehicle having the wheels thereof straddling said track means, a shoe slidably mounted on said track means, a cable connecting said shoe to the rear end of an advance vehicle, track engageable brake means on said guide means and said shoe, and cooperating means on said guide means and said shoe for bringing said brake means into braking engagement with said track means upon engagement of the guide means of a trailing vehicle with the shoe towed by an advance vehicle; said guide means including a body portion having guiding connection with said track means and a pair of tongues projecting from said body portion in spaced parallel relation, brake linings on the upper faces of said tongues and the lower faces of said tongues having faces upwardly inclined toward the ends thereof.

8. Overrunning preventing means for high speed safety control of conventional rubber tired motor vehicles comprising, in combination, a wheel engaging roadbed having a track means therein and below the surface thereof, guide means mounted on said track means, means for removably connecting said guide means to the front end of a vehicle having the wheels thereof straddling said track means, a shoe slidably mounted on said track means, a cable connecting said shoe to the rear end of an advance vehicle, track engageable brake means on said guide means and said shoe, and cooperating means on said guide means and said shoe for bringing said brake means into braking engagement with said track means upon engagement of the guide means of a trailing vehicle with the shoe towed by an advance vehicle; said guide means including a body portion having guiding connection with said track means and a pair of tongues projecting from said body portion in spaced parallel relation, brake linings on the upper faces of said tongues and the lower faces of said tongues having faces upwardly inclined toward the ends thereof; and said shoe being provided with brake lining opposed to said brake lining on said tongue means, and inclined faces on said shoe cooperating with said inclined faces on said tongues for simultaneous movement on said tongues and on said shoes toward each other upon relative longitudinal movement of the tongues and shoe.

References Cited in the file of this patent

UNITED STATES PATENTS

| | | |
|---|---|---|
| 250,005 | Rutulini | Nov. 22, 1881 |
| 680,178 | Sanderlin | Aug. 6, 1901 |
| 701,682 | Clark et al. | June 3, 1902 |
| 851,432 | O'Leary | Apr. 23, 1907 |

(Other references on following page)

UNITED STATES PATENTS

| | | |
|---|---|---|
| 867,765 | Strickler | Oct. 8, 1907 |
| 1,010,882 | Foreman | Dec. 5, 1911 |
| 1,079,230 | Flemming | Nov. 18, 1913 |
| 1,432,104 | Feucht | Oct. 17, 1922 |
| 1,442,360 | Price et al. | Jan. 16, 1923 |
| 1,448,763 | Miller | Mar. 20, 1923 |
| 1,685,035 | Robertson | Sept. 18, 1928 |
| 1,972,404 | Karl | Sept. 4, 1934 |
| 2,128,821 | Horn | Aug. 30, 1938 |
| 2,420,894 | Mee | May 20, 1947 |
| 2,619,370 | Leger | Nov. 25, 1952 |
| 2,621,609 | McCaul et al. | Dec. 16, 1952 |
| 2,635,555 | Hansson | Apr. 21, 1953 |

FOREIGN PATENTS

| | | |
|---|---|---|
| 818,920 | Germany | Oct. 29, 1951 |
| 515,825 | Great Britain | Dec. 14, 1939 |